United States Patent [19]

Yoneda et al.

[11] Patent Number: 4,502,125
[45] Date of Patent: Feb. 26, 1985

[54] NUMERICAL CONTROLLER FOR AN ANGULAR SLIDE GRINDING MACHINE

[75] Inventors: Takao Yoneda, Toyoake; Yasuji Sakakibara, Hekinan, both of Japan

[73] Assignee: Toyoda Koki Kabushiki Kaisha, Kariya, Japan

[21] Appl. No.: 458,823

[22] Filed: Jan. 18, 1983

[30] Foreign Application Priority Data

Jan. 29, 1982 [JP] Japan .................. 57-13857

[51] Int. Cl.³ ............ G06F 15/46; E05D 15/22; H02M 5/16; H02M 5/22
[52] U.S. Cl. .................. 364/474; 51/165.71; 51/165.87; 51/165.88; 364/171; 364/167; 318/569
[58] Field of Search ........... 364/474, 170, 171, 167, 364/169, 131; 318/574, 575, 569, 603; 51/165.71, 165.77, 165.87, 165.88

[56] References Cited

U.S. PATENT DOCUMENTS

| | | | |
|---|---|---|---|
| 3,486,275 | 12/1969 | Chitayat | 51/165.71 |
| 3,672,834 | 6/1972 | Corbach | 318/569 X |
| 3,828,477 | 8/1974 | Sanford et al. | 51/165.87 X |
| 4,115,958 | 9/1978 | Englander et al. | 51/165.87 X |
| 4,136,390 | 1/1979 | Farrell et al. | 364/474 |
| 4,214,309 | 7/1980 | Koide et al. | 364/474 |
| 4,293,913 | 10/1981 | Nishimura | 364/171 X |
| 4,337,599 | 7/1982 | Koide et al. | 364/474 X |
| 4,384,333 | 5/1983 | Maecker | 51/165.71 X |
| 4,424,569 | 1/1984 | Imazeki et al. | 364/474 |

FOREIGN PATENT DOCUMENTS 1577485 9/1974 Fed. Rep. of Germany.

OTHER PUBLICATIONS

Werkstatt und Betrieb, 110, (1977), 8, "Einsatz von NC Pundschleif-maschinen", by Ulrich Vetter, pp. 457-481, particularly Bild 2c.

*Primary Examiner*—Jerry Smith
*Assistant Examiner*—Jon B. Grossman
*Attorney, Agent, or Firm*—Oblon, Fisher, Spivak, McClelland & Maier

[57] ABSTRACT

A numerical controller for an angular slide grinding machine capable of controlling movement of a work table with a dressing tool in a machine coordinate system in a dressing operation and a workpiece coordinate system in a grinding operation. When the work table is initially moved to such a position as to bring the dressing tool into slight contact with an end surface of a grinding wheel carried by a wheel head, the numerical controller calculates and stores a dressing reference value indicating a positional relation between a fixed machine origination position and the dressing tool in the machine coordinate system. Prior to grinding operations for each workpiece, the work table is moved under the control of a sizing device to such a position as to present a reference surface of the workpiece to a predetermined positional relation with the original machine position. The numerical controller at this time calculates and stores a coordinate difference between the machine coordinate system and the workpiece coordinate system. When a dressing operation is needed following a grinding operation, the numerical controller calculates a dressing start position or coordinate value of the work table in the machine coordinate system based upon the dressing reference value previously calculated and stored and a dressing start coordinate value of the wheel head indicated by a present position counter for the wheel head and then, converts the calculated dressing start coordinate value into a corresponding coordinate value in the workpiece coordinate system based upon the coordinate difference previously calculated and stored.

7 Claims, 8 Drawing Figures

NUMERICAL CONTROLLER FOR AN ANGULAR SLIDE GRINDING MACHINE

BACKGROUND OF THE INVENTION

1. Field of the Invention

The present invention relates to a numerical controller for controlling feed movements of a wheel head with a grinding wheel and a work table of an angular slide grinding machine in accordance with numerical control data so that the grinding wheel can be dressed with a dressing tool fixedly provided on the work table.

2. Description of the Prior Art

Generally, conventional angular slide grinding machines have a machine origination position, which is defined by an end surface of a grinding wheel when a cylindrical surface of the grinding wheel perpendicular to the end surface reaches the axis of a workpiece rotatably carried on a work table by means of a pair of centers. The axial position of the workpiece relative to the grinding wheel is controlled by moving the work table in a machine coordinate system that originates from the original machine position or a table origination position spaced a predetermined distance therefrom in the moving direction of the work table. Center holes of workpieces of each lot have an inequality in their depths relative to reference surfaces of the workpieces. The inequality in the center hole depths causes precise positioning of each workpiece relative to the grinding wheel to be difficult, thereby degrading finish accuracy of the workpieces. Accordingly, feed movement of each workpiece relative to the grinding wheel must be compensated in order to provide for the difference between an actual size and a designed size of the center hole depth of the workpiece.

The prior art uses two methods of providing for such compensation. In a first method, an end surface sizing device is mounted on the work table, and a difference between an actual position and a designed position of the reference surface of a workpiece supported on the work table, that is a difference between an actual and designed depths of the center holes of the workpiece, is detected by the sizing device so as to compensate commanded data for the detected difference. This method requires adjustment of the mounting position of the sizing device each time the type of workpiece being machined is changed, which results in imposing a limitation upon the flexibility of the grinding machine because the adjustment of the mounting position relies on human power. The compensation of the commanded data for the detected difference requires the use of an analogue-to-digital converter. Further, there exists a prior art headstock and a tailstock which are capable of axially moving their centers to bring the reference surface of a workpiece carried thereby into a predetermined positional relation with a worktable. However, such a headstock and such a tailstock have complicated constructions and thus raise manufacturing costs.

The second prior art method employs an end surface sizing device fixedly mounted on a bed of the grinding machine. The work table is moved to bring the reference end surface of the workpiece into engagement with a probe of the sizing device and is stopped when the reference end surface reaches a sizing point. This method is used in various types of angular slide grinding machines presently in operation because it has the advantage that a single sizing device can control relative position between the grinding wheel and each of workpieces which have their reference surfaces at different axial positions and because the mounting position of the sizing device need not be adjusted once it is mounted on the bed.

In the second method, a position of the work table where the reference surface of a workpiece reaches the sizing point of the sizing device is chosen as a positioning reference for feed movements of the work table in a subsequent grinding operation of the workpiece. A coordinate value of the workpiece reference surface relative to the machine original position is preset in a table present position counter in advance of the grinding operation, and thus, a workpiece coordinate system is established for feed control of the work table in the grinding operation. The workpiece coordinate system is different in position from the machine coordinate system that originates from the machine origination position or the table origination position spaced a predetermined distance therefrom, and the positional difference therebetween corresponds to the difference between the actual and designed center hole depths of each workpiece.

In dressing the end surface and the cylindrical surface of the grinding wheel with a dressing tool fixedly provided on the work table, the positional relation between the grinding wheel and the dressing tool is determined by the position of the work table relative to the grinding wheel. In order to realize precise grinding wheel dressing, therefore, the relative movement between the grinding wheel and the dressing tool (i.e., the work table) must be controlled in the machine coordinate system which defines the position of the work table relative to the machine original position. After the completion of a machining operation, however, the workpiece coordinate system is established and maintained, and the grinding wheel dressing operation is, as a matter of fact, impossible to perform with the workpiece coordinate system being held constant.

For the reason mentioned above, when the dressing of the grinding wheel is needed between two successive grinding operations on the same workpiece in prior angular slide grinding machines, the work table must be returned to the table origination position to thereby establish the machine coordinate system again in advance of a subsequent one of the two successive grinding operations. In addition, the workpiece coordinate system must be re-established after the dressing operation by moving the work table to such a position as to set the reference surface of the workpiece to the sizing point of the sizing device.

SUMMARY OF THE INVENTION

Accordingly, it is a primary object of the present invention to provide an improved numerical controller for an angular slide grinding machine capable of precisely controlling dressing feed movements of a work table and wheel head, respectively carrying a dressing tool and a grinding wheel, with a workpiece coordinate system being established.

Another object of the present invention is to provide an improved numerical controller of the character set forth above which is capable of eliminating return movement of a work table to a table original position preceding a dressing operation and a workpiece coordinate system which determines movement of the work table following the dressing operation.

Briefly, according to the present invention, there is provided a numerical controller for controlling movements of a work table and a wheel head which are respectively movable in first and second directions intersecting each other at an acute angle. The controller includes first and second counters, which respectively indicate present positions of the work table and the wheel head for use in feed control thereof in accordance with numerical control data, and further includes first to third data processing devices, first and second storage devices and a data setting device which operates as described below. When, in order to locate the position of a dressing tool relative to the work table, the work table is moved from a table original position to such a position as to bring the dressing tool into slight contact with an end surface of a grinding wheel carried by the wheel head, the first data processing device calculates a dressing reference value based upon the present positions respectively indicated by the first and second counters. The calculated dressing reference value is stored in the first storage device. The table origination position is defined to be spaced a predetermined distance from a fixed machine origination position.

In order to establish a workpiece coordinate system prior to grinding feed control, the work table is moved under the control of a sizing device engageable with the workpiece to such a position as to present a reference end surface of the workpiece to a predetermined positional relation with the machine original position. At this time, the data setting means presets in the first counter a distance between the machine original position and a reference end surface of the workpiece in the first direction for enabling the first counter to indicate the present position of the work table in a workpiece coordinate system prior to a grinding operation of the workpiece. In addition, a coordinate difference between a machine coordinate system and the workpiece coordinate system is calculated by the second data processing device and is stored in the second storage device. The machine coordinate system originates from the machine origination position.

When a dressing operation is needed following a grinding operation, a dressing start coordinate value of the work table is calculated by the third data processing device. This calculation is performed based upon the dressing reference value and the coordinate difference respectively stored in the first and second storage devices and the present position which the second counter indicates when the wheel head is at a dressing start position thereof. Because the coordinate difference is used in the calculation, the calculated dressing start coordinate value of the work table indicates a coordinate value in the workpiece coordinate system into which a dressing start coordinate value in the machine coordinate system has been converted. This advantageously permits the machine operator to input coordinate values of the workpiece coordinate system as command values without taking into consideration the coordinate difference between the workpiece coordinate system and the machine coordinate system when programming numerical control data for the dressing operation. Moreover, the provision of the third data processing device makes it possible to perform a dressing operation between two successive grinding operations on the same workpiece without returning the work table to the original table position and to eliminate the requirement re-establishment of the workpiece coordinate system.

BRIEF DESCRIPTION OF THE DRAWINGS

The foregoing and other objects and many of the attendant advantages of the present invention will be readily appreciated as the same becomes better understood by reference to the following detailed description of a preferred embodiment when considered in connection with the accompanying drawings, in which.

DETAILED DESCRIPTION OF THE PREFERRED EMBODIMENT

Figure 1:
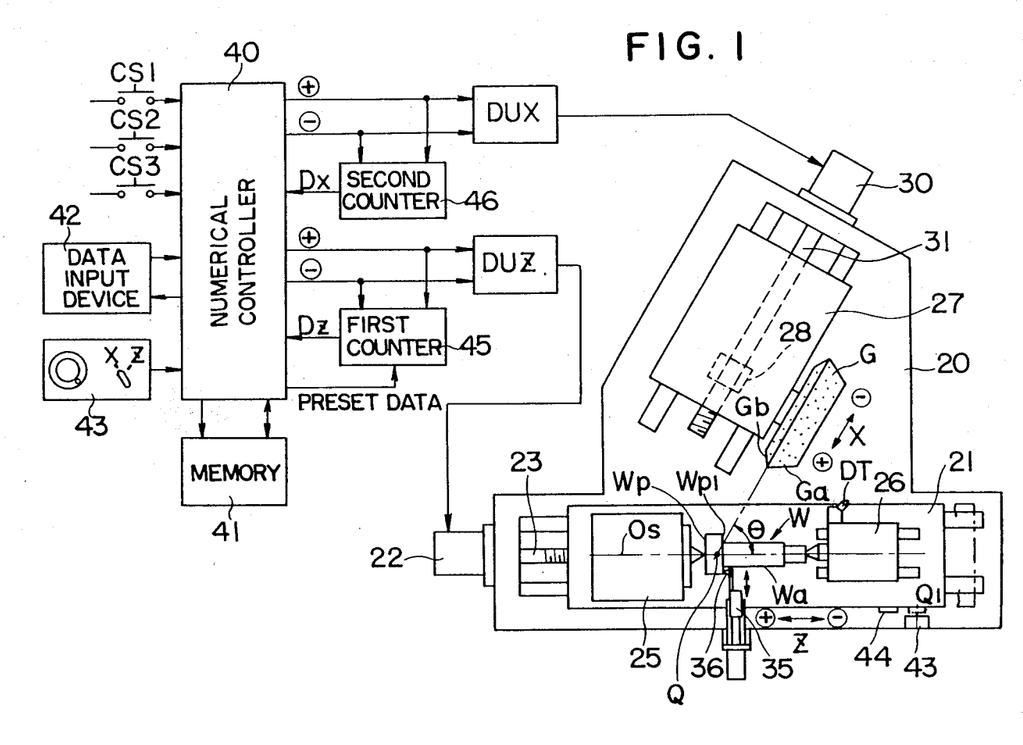
FIG. 1 is a schematic plan view of an angular slide grinding machine shown along with a block diagram of a numerical controller according to the present invention.

Referring now to the drawings, wherein like reference numerals designate same or corresponding parts throughout the several views, and particularly to FIG. 1 thereof, an angular slide grinding machine is shown having a work table 21, which is guided to be slidable in a Z-axis direction along a pair of guide ways formed on a front-top portion of a bed 20. The work table 21 is in threaded engagement with a feed screw shaft 23 rotatable by a stepping motor 22. The table 21 fixedly carries thereon a headstock 25 and a tailstock 26, respectively, having centering pieces (not shown). A workpiece W having a cylindrical portion Wa and a shoulder portion Wp1 contiguous thereto which are to be ground is rotatably supported by means of the centers.

A wheel head 27 rotatably carries a grinding wheel G, which has a cylindrical surface Ga parallel to a headstock axis Os and an end surface Gb perpendicular to the cylindrical surface Ga. The wheel head 27 is guided by a pair of guide ways formed on the bed 20 to be slidable in an X-axis direction which intersects the Z-axis direction at an acute angle $\theta$. The wheel head 27 is fixedly provided with a nut 28, which is in threaded engagement with a feed screw shaft 31 drivingly connected to a stepping motor 30. The screw pitch of the feed screw shaft 31 is so chosen that when the stepping motor 30 is rotated in response to each pulse, the cylindrical surface Ga of the grinding wheel G is moved a predetermined unit distance in a direction perpendicular to the headstock axis Os.

Secured to a lateral surface of the tailstock 26 near the wheel head 27 is a dressing tool DT, which protrudes in a direction approximately parallel to the moving direction of the wheel head 27. An end surface sizing device 35 mounted on the bed 20 is movable toward and away from the workpiece W and has a measuring probe 36 engageable with a sizing surface Wp1 of the workpiece W. The sizing device 35 controls movement of the work table 21 to position the sizing surface Wp1 at a sizing point, whereby a workpiece coordinate system is set as described in detail later.

A numerical controller 40 primarily composed of a computer is connected through interface circuits (not shown) with a data input device 42, a manually operated pulse generator 43 and various command switches CS1-CS3 for respectively instructing a machining start, a dressing tool position detection and a dressing, in addition to a memory 41. The numerical controller 40, when given a machining start command r a dressing command, distributes feed pulses to drive units DUZ and DUX which respectively drive the stepping motors 22 and 30, so that the work table 21 and the wheel head 27 are moved for workpiece machining or dressing.

A first reversible counter 45 is connected to receive positive-going pulses (+) and negative-going pulses (−) distributed to the drive unit DUZ and to output position data Dz representing the present position of the work table 21. Similarly, a second reversible counter 46 is connected to receive positivegoing pulses (+) and negative-going pulses (−) distributed to the drive unit DUX and to output position data Dx representing the present position of the wheel head 27. The numerical controller 40 is also connected to output terminals of the first and second counters 45 and 46 through an interface circuit (not shown) so that it can fetch the position data Dz and the position data Dx. In this particular embodiment, a reference position of the wheel head 27 is determined to be a position where the cylindrical surface Ga of the grinding wheel G contacts the headstock axis Os. The position data Dx output from the second counter 46 is indicative of how much distance the wheel head 27 has been retracted from the reference position, by means of the double of a distance between the cylindrical surface Ga and the headstock axis Os. Further, a reference position of the work table 21 is determined to be a table original position where the work table 21 is located as indicated by the phantom line in FIG. 1. The position data Dz output from the first counter 45 is indicative of how much distance the work table 21 has been displaced from the table original position towards the left.

An original machine position Q is determined as a point where the wheel end surface Gb contacts the headstock axis Os when the wheel cylindrical surface Ga reaches the headstock axis Os, and is maintained immobile irrespective of displacements of the wheel head 27 and the work table 21. Thus, the table origination position can be defined as a position 21 where a magnet 44 secured to the work table 21 is detected by an original position detector 43, which is fixed on the bed 20 spaced a predetermined distance from the machine original position Q. The first counter 45 is reset to indicate zero each time the work table 21 is returned to the original table position Q1, and counts feed pulses when the work table 21 is moved toward and away from the original table position Q1, so as to indicate the table present position. That is, the first counter 45 is indicative of the actual position of the work table 21 in a machine coordinate system which shows how much distance the work table 21 has been displaced from the table original position Q1. Unless a precise position of the tip of the dressing tool DT is known, grinding wheel dressing effected by the relative movement between the dressing tool DT and the grinding wheel G cannot be properly carried out. For the purpose of grinding wheel dressing, therefore, the coordinate value of the dressing tool DT relative to the machine original position Q must be calculated, and this calculation will be described hereafter.

(I) Detection of Dressing Tool Position

Since the dressing tool DT is moved bodily with the work table 21, there is obtained a coordinate value of the dressing tool DT relative to the machine original position Q when the table 21 is at the table original position Q1 as a positioning reference.

Figure 2:
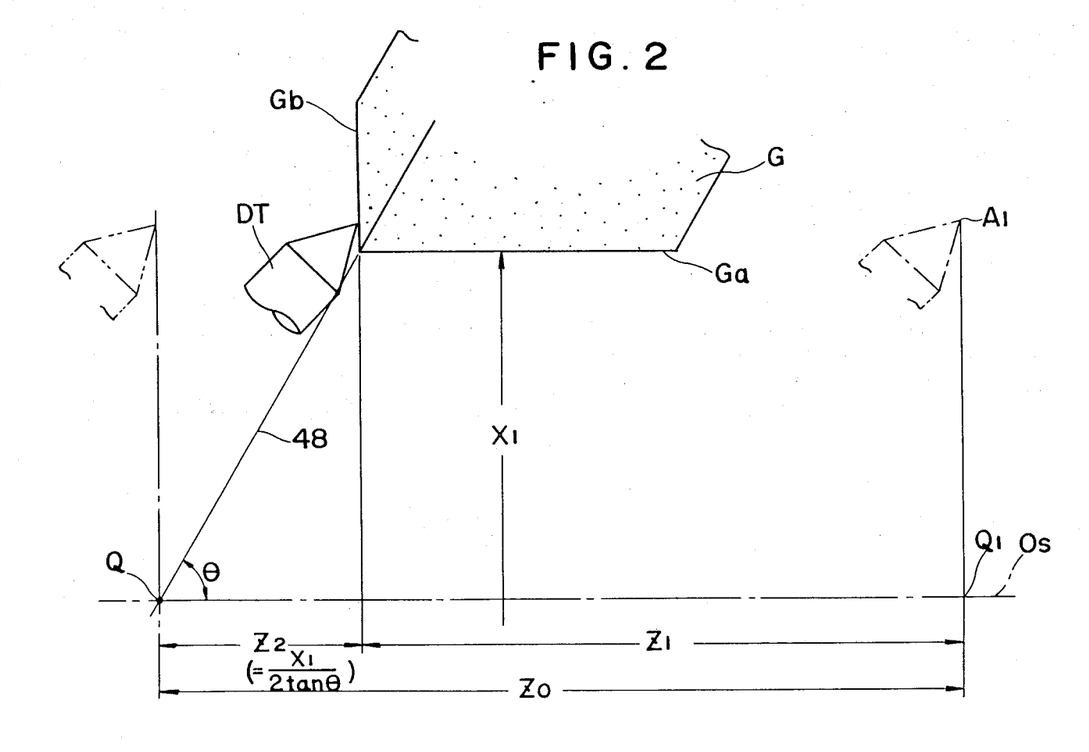
FIG. 2 is an explanatory view showing the positional relation between a grinding wheel and a dressing tool in an operation for detecting the position of the dressing tool.
Figure 5:
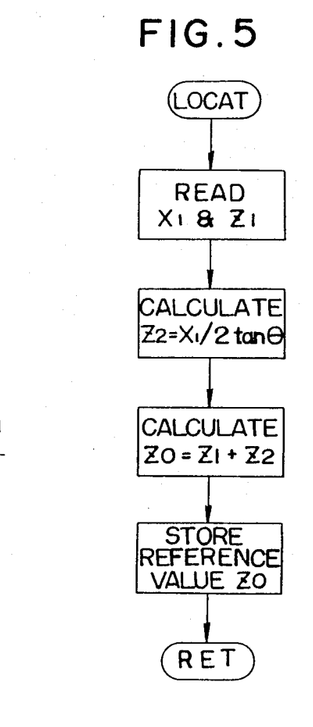
FIG. 5 is a flow chart showing processings executed by the numerical controller in the dressing tool position detection operation shown in FIG. 2.

As shown in FIG. 2, when the work table 21 is at the table origination position Q1, the dressing tool DT is located at a point A1. In this situation, the pulse generator 43 is manually operated to move the work table 21 and the wheel head 27 so that the tip of the dressing tool DT is brought into slight contact with the wheel end surface Gb. At this time, the value Z1 of the first counter 45 is read which represents the table present position, that is the moving distance of the work table 21 from the table origination position Q1. The value X1 of the second counter 46 is also read which represents the wheel present position, that is the moving distance of the wheel cylindrical surface Ga relative to the headstock axis Os. The distance Z2 of the wheel side surface Gb relative to the machine origination position is obtained by a calculation of $Z_2 = X1/(2\tan\theta)$. The coordinate value Z0 of the dressing tool DT is Z1+Z2 and is stored as a reference value for dressing tool positioning. In order to bring the tip of the dressing tool DT into slight contact with the wheel side surface Gb at the first stage of the grinding wheel dressing operation, the positioning of the work table 21 is performed by reference to the reference value Z0, as fully described later. When the command switch CS2 is depressed with the tip of the dressing tool DT being in slight contact with the wheel side surface Gb, processings according to a flow chart shown in FIG. 5 are executed by the numerical controller 40 so as to calculate and store the reference value Z0.

(II) Positioning of Workpiece Reference Surface

Figure 3:
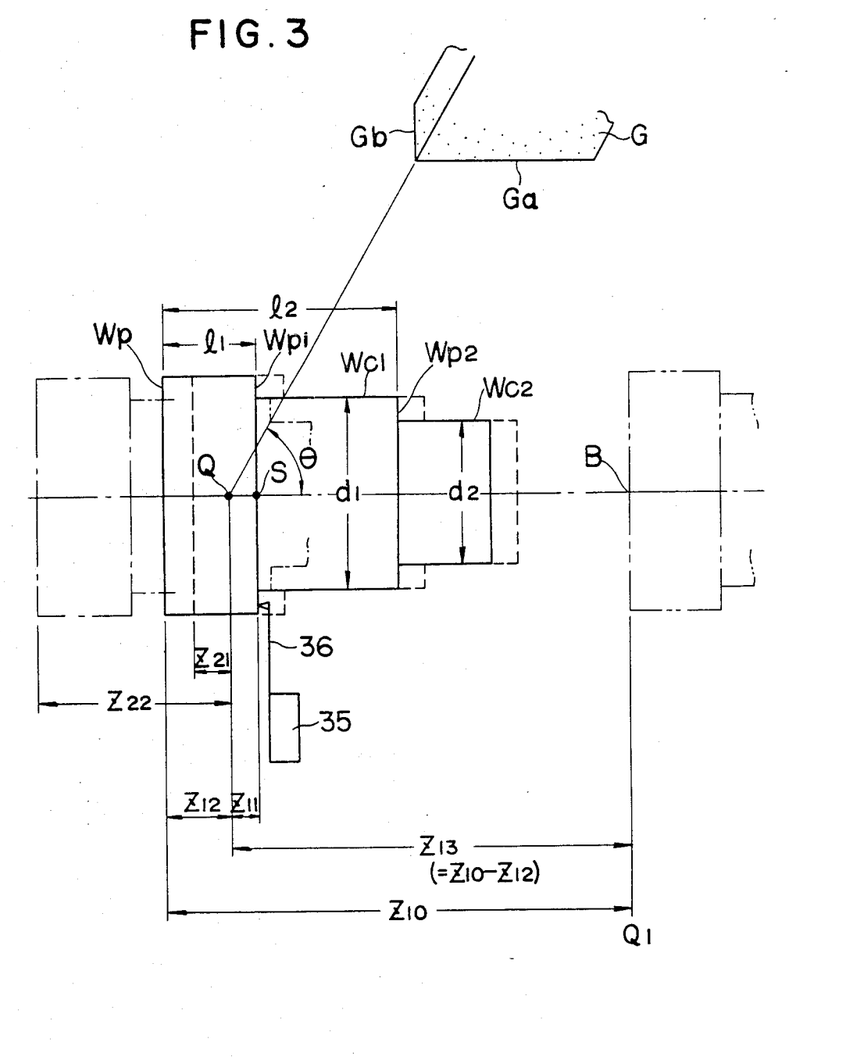
FIG. 3 is another explanatory view showing the positional relation between the grinding wheel and a workpiece in another operation for positioning a reference surface of the workpiece.

Inequality of workpiece center holes in depth causes reference surfaces Wp of workpieces W supported by the headstock and footstock centers to vary their positions. It is therefore preferable that the sizing surface Wp1 of each workpiece W supported by the headstock and tailstock centers is positioned to a sizing point under the control of the end surface sizing device 35 fixedly provided on the bed 20. It is usual that the left end surface of the workpiece as shown in FIG. 3 is chosen as the reference surface Wp and that a length l1, from the reference surface Wp to the sizing surface Wp1 which is engaged with the measuring probe 36, has been precisely measured in advance to be a known value.

Assuming now that the work table 21 at the table original position Q1 locates the workpiece reference surface Wp at a position B, the first counter 45 indicates a value Z10 after the work table sizing surface Wp1 with the measuring probe 36 causes the end surface sizing device 35 to output a sizing signal. As described previously, the coordinate value Z11 of the sizing point S relative to the machine origination position Q has also been precisely measured in advance and has been known. Thus, the position Z12 of the workpiece reference surface Wp relative to the machine origination position Q, when the workpiece sizing surface Wp1 is at the sizing point S, is obtained by a calculation of Z12 = l1 − Z11.

(III) Setting in Workpiece Coordinate System

When the coordinate value of the workpiece reference surface Wp relative to the machine origination position Q indicates the value Z12, the first counter 45 for table present position indicates the value Z10. A workpiece coordinate system in which the workpiece reference surface Wp is used as a positioning reference is established by setting the value Z12 in the first counter 45 instead of the value Z10. For the purpose of establishing the workpiece coordinate system, a setting code G92Z(l1-Z11) has been programmed in the numerical control program (not shown), and executed by the numerical controller 40 processings according to a flow chart shown in FIG. 7.

Figures 6, 7, 8:
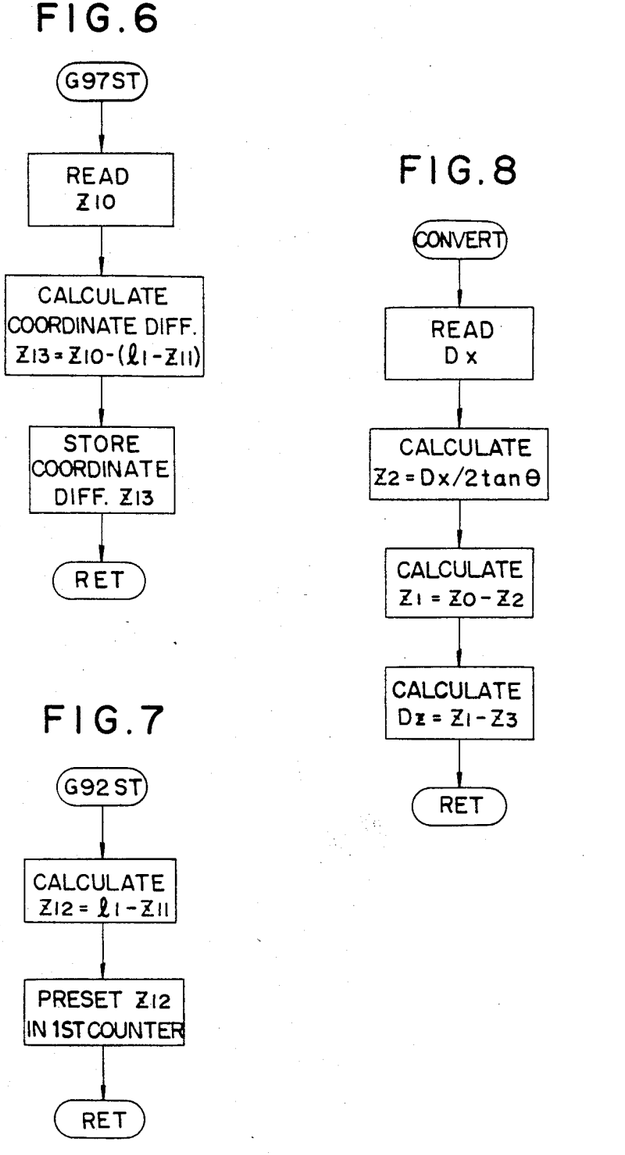
FIG. 6 is another flow chart showing processings executed by the numerical controller for calculating and storing a coordinate difference after the positioning operation shown in FIG. 3.
FIG. 7 is another flow chart showing processings executed by the numerical controller for establishing a workpiece coordinate system after the positioning operation shown in FIG. 3.
FIG. 8 is another flow chart showing processings executed by the numerical controller for calculating a dressing start coordinate value of a work table before the dressing operation shown in FIG. 4.

A coordinate difference (Z10 − Z12) between the value Z10 in the machine coordinate system and the value Z12 in the workpiece coordinate system must be calculated and stored prior to establishing the workpiece coordinate system. The numerical control program is programmed to include a coordinate difference storage code G97Z(l1-Z11) in a block preceding the setting code G92Z(l1-Z11), so that processings according to a flow chart shown in FIG. 6 are executed to thereby calculate and store the coordinate difference (Z10 − Z12).

The workpiece coordinate system is maintained in force until the machining of each workpiece is completed, and the machining operation of each workpiece is controlled by moving the work table 21 to various positions in the workpiece coordinate system. The work table 21 is returned to the table original position Q1 upon completion of the machining operation on one workpiece, and another unfinished workpiece is set up on the grinding machine in place of the finished workpiece. Return of the work table 21 to the original table position Q1 results in the first counter 45 being reset to indicate zero, thereby resetting the machine coordinate system. The work table 21 is then displaced to set the sizing surface WP1 of the unfinished workpiece to the sizing point S, whereafter a new coordinate difference (Z10 − Z12) is calculated and stored in place of the previous coordinate difference.

(IV) Control of Machining Operation

The machining operation on each unfinished workpiece W is followed by the positioning of the workpiece sizing surface Wp1 to the sizing point S and the setting of the workpiece coordinate system. In order for the grinding wheel G to simultaneously grind the sizing surface Wp1 and the cylindrical surface Wc1, the work table 21 must be positioned such that the workpiece W is located as indicated by the broken line in FIG. 3. When the workpiece W is so located, the coordinate value of the workpiece reference surface Wp is expected to be a value Z21, as indicated in FIG. 3. The numerical control program includes as programmed data the length l1 between the reference surface Wp and the sizing surface Wp1 and the diameter d1 of the cylindrical surface Wc1, from which the coordinate value Z21 of the reference surface Wp is calculated by the following equation.

$$Z21 = (l1 - d1)/(2 \tan \theta) \quad (1)$$

In programming the numerical control program, the value l1 is input as Z-axis command data and the value d1 is input as R-command data designating a finished diameter of the cylindrical surface Wc1. A code G11 is allocated to the auxiliary function command for obtaining the coordinate value Z21 of the workpiece reference surface Wp by the calculation of the equation (1) and for controlling feed movement of the work table 21. Accordingly, a part of the numerical control program which instructs the grinding operation at the first grinding step is programmed as follows:

G11 Zl1 Rd1
Xd1

When the part of the numerical control program is executed, the coordinate value Z21 of the workpiece reference surface Wp is calculated based upon the programmed values l1 and d1, and the feed movement of the work table 21 is controlled to position the workpiece W as indicated by the broken line in FIG. 3. Subsequently, the wheel head 27 is advanced to a position where the position data Dx from the second counter 46 which indicates the wheel head present position comes into coincidence with the programmed data d1, whereby the first machining portion of the workpiece W is ground as programmed.

A second machining portion of the workpiece W includes another end surface Wp2 and another cylindrical surface Wc2. The length between the workpiece reference surface Wp and the end surface Wp2 and the diameter of the another cylindrical surface Wc2 are respectively values l2 and d2, which are input in another part of the numerical control program as follows:

G11 Zl2 Rd2
Xd2

The coordinate value of the reference surface Wp in the case is indicated as a value Z22 in FIG. 3 and is calculated by inserting in the aforementioned equation (1) values l2 and d2 which respectively replace the values l1 and d1. The work table 21 is displaced to a position where the first counter 45 for table present position indicates the calculated value Z22. The wheel head 27 is then advanced until the position data Dx from the second counter 46 comes into coincidence with the programmed value d2, whereby the second machining portion of the workpiece W is ground as programmed.

Since the workpiece coordinate system is maintained set upon completion of a grinding operation, it is impossible to make precise positionings of the dressing tool DT relative to the grinding wheel end surface Gb. However, coordinate values in the machine coordinate system can be respectively converted into corresponding coordinate values in the workpiece coordinate system when each value is changed by subtracting the coordinate difference Z13. This makes it possible to precisely position the work table 21 or the dressing tool DT in accordance with command values of the machine coordinate system, with the workpiece coordinate system being maintained.

The coordinate value D8 in the machine coordinate system, of the dressing tool DT being in slight contact with the wheel end surface Gb is obtained by the calculation of $(XO - DX/2\tan\theta)$, namely by subtracting a compensation value Z2 proportional to a wheel head position DX from the reference value ZO for dressing tool positioning. The calculated coordinate value in the machine coordinate system, when further subtracted by the coordinate difference Z13, is converted into a corresponding value in the workpiece coordinate system. Accordingly, the dressing tool DT can be precisely positioned to have slight contact with the wheel end surface Gb by inputting a subtraction command (Z0−Z2−Z13) in the numerical control program. As described above, table feed commands for grinding wheel dressing are input as command values of the machine coordinate system in the numerical control program and are programmed to be convertible into corresponding coordinate values of the workpiece coordinate system by subtracting the coordinate difference Z13 from each value.

Figure 4:
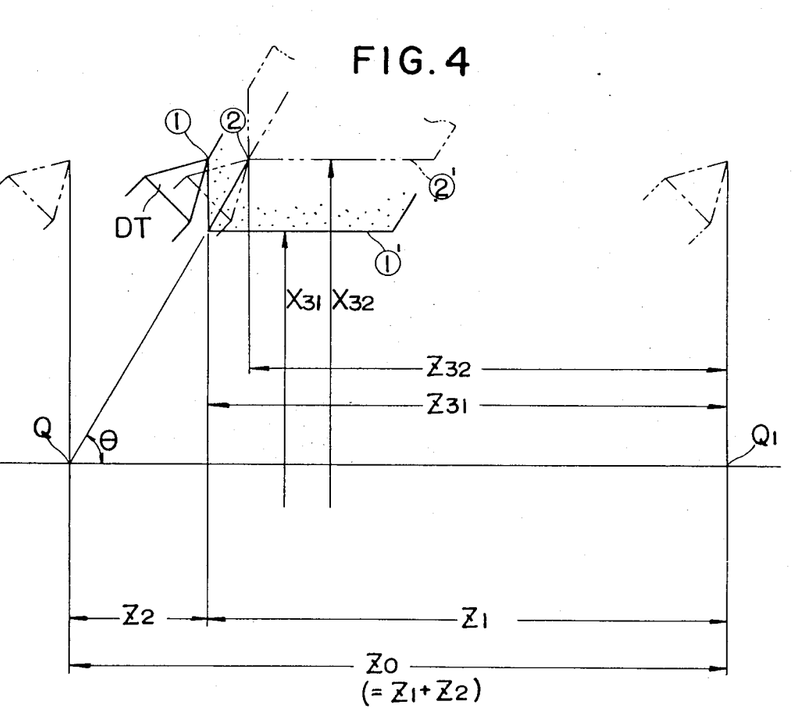
FIG. 4 is still another explanatory view showing the positional relation between the grinding wheel and the dressing tool in a dressing operation.

The dressing operation of the wheel end surface Gb is initiated from the state as shown in FIG. 4 wherein the dressing tool DT and the grinding wheel G are respectively located at positions Z31 and X31. Movements of the work table 21 and the wheel head 27 are simultaneously controlled in such a way that when the dressing tool DT reaches a position Z32, the grinding wheel G reaches a position X32. It is to be noted herein that the value X32 is a known value having been precisely measured in advance, which indicates the doubling of the coordinate value of the dressing tool tip relative to the headstock axis Os.

A program which designates the dressing start positions of the dressing tool DT and the grinding wheel G in the above-described case is exemplified as follows:

G11 X(X31) Z(Z0-Z13) R(X31)

A program which designates the dressing end positions of the dressing tool DT and the grinding wheel G is exemplified as follows:

G11 X(X32) Z(Z0-Z13) R(X32)

It is apparent that these programs exemplified are, in fact, modified taking a dressing infeed depth against the grinding wheel G into consideration. The Z-axis command Z(Z0-Z13) of the programs is indicative of the coordinate value of the dressing tool in the machine coordinate system which value is to be converted into a corresponding coordinate value in the workpiece coordinate system by subtracting the coordinate difference Z13.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A numerical controller for a grinding machine wherein a work table rotatably carrying a workpiece and having a dressing tool fixed thereon is movable in a first direction parallel with the rotational axis of said workpiece and wherein a wheel head rotatably carrying a grinding wheel is movable in a second direction which makes an acute angle with said first direction, comprising:

a first counter for indicating a present position of said work table in a machine coordinate system which originates from an original table position spaced a predetermined distance from an original machine position in said first direction, said original machine position being defined by an end surface of said grinding wheel when a cylindrical surface of said grinding wheel reaches the axis of said workpiece;

a second counter for indicating a present position of said wheel head as a distance between said axis of said workpiece and said cylindrical surface of said grinding wheel;

said present positions respectively indicated by said first and second counters being for use in controlling movements of said work table and said wheel head in accordance with numerical control data;

first data processing means responsive to said present positions respectively indicated by said first and second counters when said work table is moved to such a position as to bring said dressing tool into slight contact with said end surface of said grinding wheel, for calculating a dressing reference value indicative of a positional relation between said machine original position and said dressing tool;

first storage means for storing said dressing reference value calculated by said first data processing means;

data setting means for setting in said first counter a distance between said original machine position and a reference end surface of said workpiece in said first direction when under the control of a sizing device engageable with said workpiece said work table is positioned to present said reference end surface to a predetermined positional relation with said original machine position, so as to enable said first counter to indicate said present position of said work table in a workpiece coordinate system prior to a grinding operation of said workpiece;

second data processing means for obtaining a coordinate difference between said machine coordinate system and said workpiece coordinate system when under the control of said sizing device said work table is positioned to set said reference end surface of said workpiece in said predetermined positional relation with said original machine position;

second storage means for storing said coordinate difference obtained by said second data processing means; and third data processing means responsive to said dressing reference value and said coordinate difference respectively stored in said first and second storage means and said present position indicated by said second counter when said wheel head is at a dressing start position thereof, for calculating a dressing start position of said work table in said workpiece coordinate system prior to a dressing operation which is performed following said grinding operation.

2. A numerical controller as claimed in claim 1, wherein said workpiece has a sizing end surface engageable with said sizing device and spaced a first known value from said reference end surface in said first direction, and wherein said controller further comprises:

fourth data processing means for calculating said distance set by said data setting means in said first counter by subtracting from said first known value a second known value which corresponds to a distance between said original machine position and said sizing end surface of said workpiece when under the control of said sizing device said work table is positioned to present said reference end surface of said workpiece to said predetermined positional relation with said original machine position.

3. A numerical controller as claimed in claim 2, wherein said second data processing means calculates said coordinate difference by subtracting said distance calculated by said fourth data processing means from said present position indicated by said first counter when under the control of said sizing device said work table is positioned to present said reference end surface of said workpiece to said predetermined positional relation with said machine original position.

4. A numerical controller as claimed in claim 2, wherein said third data processing means includes:
first calculation means responsive to said dressing reference value stored in said first storage means and said present position indicated by said second counter when said wheel head is at said dressing start position thereof, for calculating a coordinate value in said machine coordinate system which said work table has when positioned at said dressing start position thereof; and
second calculation means responsive to said coordinate value calculated by said first calculation means and said coordinate difference stored in said second storage means for calculating a coordinate value in said workpiece coordinate system corresponding to said coordinate value calculated by said first calculation means.

5. A numerical controller as claimed in claim 4, wherein said first calculation means calculates a cotangent component of said present position indicated by said second counter when said wheel head is at said dressing start position thereof, with respect to said acute angle made by said first and second directions and subtracts said cotangent component from said dressing reference value stored in said first storage means for calculating said coordinate value in said machine coordinate system which said work table has when positioned at said dressing start position thereof.

6. A numerical controller as claimed in claim 2, wherein said dressing reference value calculated by said first data processing means represents a distance between said original machine position and said dressing tool in said first direction when said work table is at said original table position.

7. A numerical controller as claimed in claim 6, wherein said first data processing means includes:
third calculation means operable when said work table is moved to such a position as to bring said dressing tool into slight contact with said end surface of said grinding wheel, for calculating a cotangent component of said present position indicated by said second counter with respect to said acute angle made by said first and second directions; and
fourth calculation means for calculating said dressing reference value by adding said cotangent component calculated by said third calculation means to said present position indicated by said first counter when said work table is moved to such a position as to bring said dressing tool into slight contact with said end surface of said grinding wheel.

* * * * *